United States Patent [19]

Kobayashi et al.

[11] Patent Number: 5,404,255
[45] Date of Patent: Apr. 4, 1995

[54] DISK APPARATUS AND ITS CONTROL METHOD

[75] Inventors: Masahito Kobayashi, Ibaraki; Takashi Yamaguchi, Tsuchiura; Hiromu Hirai, Tsukuba; Hideaki Amano; Katsuhiro Tsuneta, both of Odawara, all of Japan

[73] Assignee: Hitachi, Ltd., Tokyo, Japan

[21] Appl. No.: 9,089

[22] Filed: Jan. 26, 1993

[30] Foreign Application Priority Data

Mar. 18, 1992 [JP] Japan .................. 4-061857

[51] Int. Cl.⁶ .............................................. G11B 5/596
[52] U.S. Cl. .................. 360/78.09; 360/77.04; 360/78.07
[58] Field of Search .......... 360/78.07, 78.09, 78.04, 360/77.02, 77.04; 369/44.36

[56] References Cited

U.S. PATENT DOCUMENTS

| | | | |
|---|---|---|---|
| 4,814,909 | 3/1989 | Brown et al. | 360/78.07 |
| 4,907,109 | 3/1990 | Senio | 360/78.07 |
| 4,954,908 | 9/1990 | Sengoku | 360/78.04 |
| 4,965,501 | 10/1990 | Hashimoto | 360/78.07 X |
| 5,063,454 | 11/1991 | Hashimoto | 360/78.04 |
| 5,189,578 | 2/1993 | Mori et al. | 360/77.02 X |
| 5,229,896 | 7/1993 | Tohyama et al. | 360/78.04 X |
| 5,257,252 | 10/1993 | Barnes et al. | 360/78.09 X |

FOREIGN PATENT DOCUMENTS

| | | |
|---|---|---|
| 63-23280 | 1/1988 | Japan . |
| 63-274395 | 11/1988 | Japan . |
| 2-94187 | 4/1990 | Japan . |

*Primary Examiner*—Aristotelis Psitos
*Assistant Examiner*—James L. Habermehl
*Attorney, Agent, or Firm*—Antonelli, Terry, Stout & Kraus

[57] ABSTRACT

A disk apparatus has a gain identifying apparatus for identifying a gain from a control signal for controlling each head to a detection position signal, a memory device to store the identified gain, and an apparatus for correcting the control signal on the basis of the gain at at time point when each head which is provided for each recording surface of disks is located at each of a plurality of track positions.

22 Claims, 7 Drawing Sheets

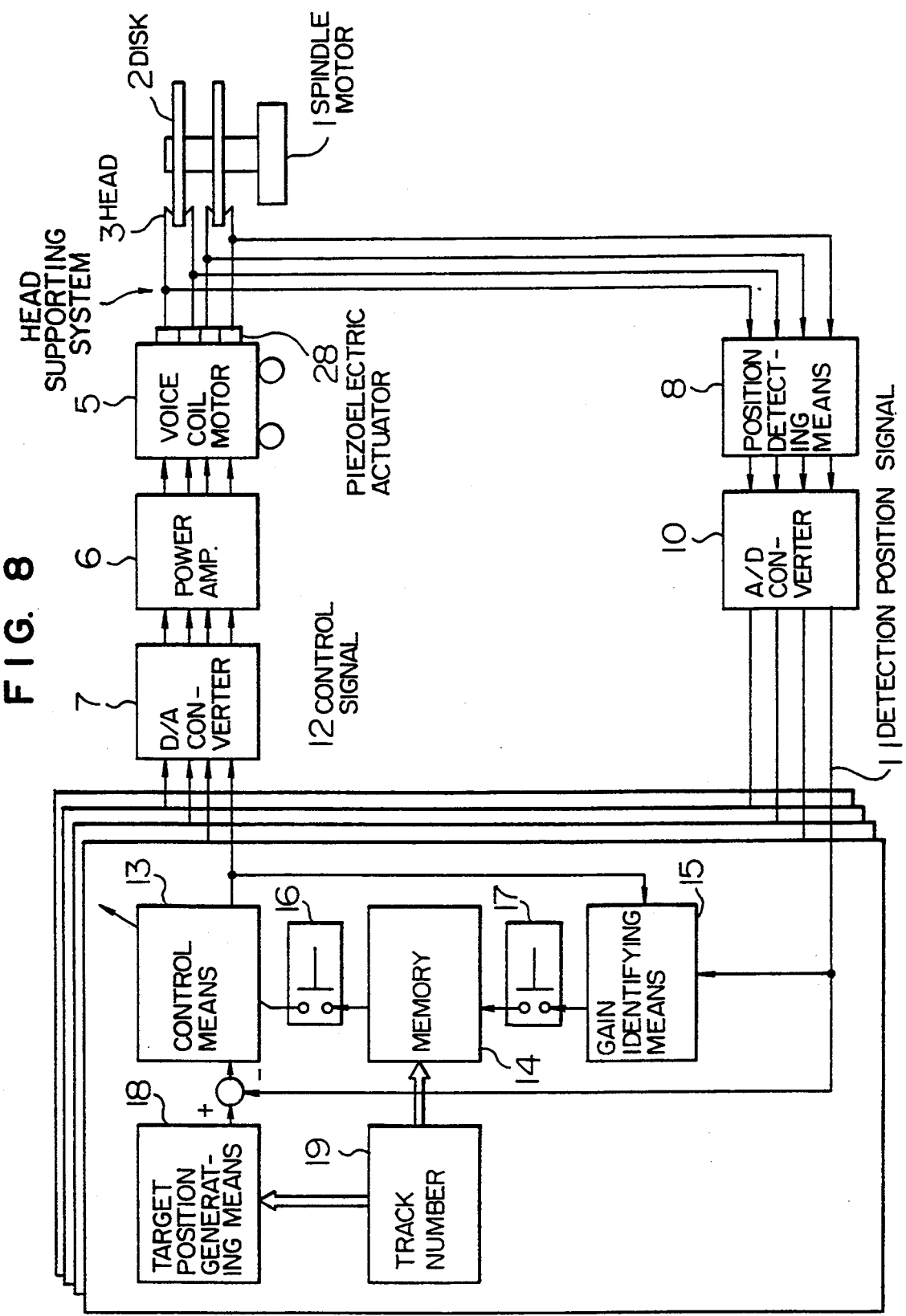

DISK APPARATUS AND ITS CONTROL METHOD

BACKGROUND OF THE INVENTION

1. Field of the Invention

The invention relates to a magnetic disk apparatus and an optical disk apparatus each having two or more positioning heads and, more particularly, to a magnetic disk apparatus and an optical disk apparatus which are suitable for high density recording.

2. Description of the Related Art

In a disk apparatus, for example, a magnetic disk apparatus, to accomplish high density recording, a sector servo system to position a data head on the basis of a position reference signal recorded in the head of a sector on a data recording surface or a servo system based on such a sector servo system is generally used. Those servo systems based on a sector signal are suitable to position the head to the center of a target track with a high precision. As for a compensator of the above servo systems, since a position signal is discretely obtained, a digital filter is constructed using a microprocessor, and the compensator is determined on the basis of the dynamic characteristic of a control target. The dynamic characteristic of the control target refers to the loop gain from a control signal outputted from the compensator to a detection position signal inputted to the compensator and is given by the product of the gain of a voice coil motor, the gain of an amplifier, the equivalent mass of the head, the position detection gain, and the square of the sampling time.

However, the loop gain of the control target varies in dependence on manufacturing tolerance, an operating condition, an operation environment, and an aging change. Particularly, the gain of the voice coil motor and the position detection gain vary for the following reasons, thereby obstructing the high speed movement of the head and the high accurate positioning operation of the head, so that the performance of the apparatus is deteriorated.

A force constant of the gain of the voice coil motor changes in dependence on the operation track position of the head due to a leakage of the magnetic flux across the voice coil. That is, force constants at the inner and outer peripheries of the disk are small and a force constant at an intermediate position between them is large.

The position detection gain changes due to variations in the peripheral velocity of the disk at which the head is located, the floating amount of the head from the disk surface, and the core width of the head.

That is, since the peripheral velocity on the outer peripheral side of the disk is large, the change in magnetic flux becomes large, a reading voltage of the head becomes large, and the position detection gain increases. When the floating amount of the head is small, the reading voltage becomes also large and the position detection gain also increases. Further, when the core width of the head is larger than a design reference value, the reading voltage becomes large and the position detection gain increases.

Hitherto, means for individually solving the above problems has been proposed. For instance, a method of correcting the change in force constant of the voice coil motor is disclosed in JP-A-63-274395. As an example of the means for totally solving the above problems, a method whereby a loop gain of a mechanism system is automatically estimated during two special speed controls, and compensation elements of the control system are adjusted on the basis of the result of the estimation is disclosed in JP-A-63-23280. Further, a method of obtaining a circular loop gain of an open loop including the voice coil motor and the position detection gain is disclosed in JP-A-2-94187.

Among the above conventional techniques, the technique disclosed in JP-A-63-274395 uses a method whereby correction coefficients corresponding to the position of a head are stored as a table in a memory section in a control apparatus and the correction coefficient is taken out from the table in correspondence to the movement of the head, thereby changing the gain of a compensator. According to such a method, however, since the correction coefficients have already been stored in the table before shipping of the apparatus, a variation of the gain of the voice coil motor of each apparatus cannot be corrected.

Among the above conventional techniques, the technique disclosed in JP-A-63-23280 uses a method whereby an estimation value of loop gain of a mechanism system is calculated by control signals and position signals of one data during the acceleration stage of the speed control and one data during the deceleration stage. Thus, only a rough estimation value can be obtained and a variation of the loop gain between the tracks and a variation of the loop gain of each head cannot be reduced.

As a correcting method of the position detection gain, a method of using an automatic gain control (AGC) amplifier to correct a change in reading voltage due to changes in peripheral velocity of the disk and the head floating amount is known. According to such a method, however, a variation in position detection gain in association with the manufacturing tolerance of the core width of every head cannot be reduced.

Further, among the above conventional techniques, the technique disclosed in JP-A-2-94187 relates to a method of automating a frequency response method whereby a sine wave disturbance of 330 Hz of a zero-cross frequency is added into a servo control loop and the gain in the loop is repetitively adjusted until the ratio of the amplitudes of the sine wave-like signals before and after the addition point is equal to 1. Consequently, the circular loop gain of the open loop can be set to 0 dB by the zero-cross frequency. According to the conventional technique, a point that the above method is applied to all of the heads is shown. According to the above method, however, a fluctuation of the force constant of the voice coil motor due to the operating track position of the head cannot be corrected.

On the other hand, there are the following steps also have been suggested: a step until output signals before and after the addition point are settled to stationary states after a disturbance sine wave was added; a step of measuring an amplitude of each of the sine wave-like signals before and after the addition point of 330 Hz in a state in which the disturbance sine wave has been applied along with subtracting from it the amplitudes of the signals before and after the addition point of 330 Hz in a state in which no disturbance sine wave is applied from the measurement values in order to eliminate a noise component of the signal; and a step of performing a discrete time Fourier transformation on each of the signals before and after the addition point in order to extract only the signal component of 330 Hz of the disturbance sine wave for the above operations. A long time is necessary for each of the above steps. Consequently, there is a problem from viewpoints of time and precision when the automation of the frequency response method is applied to a plurality of heads.

The above matters are important subjects to be solved to realize a high recording density of the disk apparatus, high density installation, high accurate positioning, and high transfer speed.

Although the high recording density can be accomplished by narrowing the track interval and by using a servo system based on a sector signal, in order to realize the narrow track interval, it is necessary to narrow the core width of the head. In association with the narrow core width of the head, there occurs a problem such that the ratio of the manufacturing tolerance to the head core width increases and, consequently, the variation of the position detection gain increases.

Although a high density installation can be accomplished by installing a large number of disk surfaces, in case of the servo system based on the sector signals of the disk surfaces, the positioning heads exist with respect to only the disk surfaces on which the sector signals have been recorded and the position detection gain of each head varies.

For instance, in case of a magnetic disk apparatus of 3.5 inches, which size of disk is typical, when the height of the disk apparatus is equal to 41.3 mm, ten to fourteen positioning heads exist. The manufacturing tolerance of the core width of each positioning head is about 20% when the track interval is set to 2000 TPI (tracks per inch). Further, as a force constant of the voice coil motor, there is a difference of about 10% between the gain of the outer periphery of the disk and the gain of the intermediate position. That is, as a gain fluctuation of a control target in one disk apparatus, the gain fluctuation becomes up to about 30% because of the realization of high recording density and high density installation. Moreover, there is a tendency such that the gain fluctuation of the control target increases due to the realization of high recording density and high density installation of a future disk apparatus.

Although the realization of a high accurate positioning can be accomplished by positioning the head to the center of a target track at a high speed and a high precision, it is necessary to suppress the gain fluctuation (about 30%) of the control target to ±4% for this purpose. Particularly, to the head at a high speed and a high precision, it is effective to apply a modern control theory such that the control target is modeled and control means is designed on the basis of such a model. To position the head at a high speed and a high precision, it is necessary to preliminarily accurately know the model of the control target.

Further, the realization of a high transfer speed of data can be accomplished by a method whereby data recorded on a plurality of disk surfaces is simultaneously read and written by all of the heads. For this purpose, after all of the heads were moved in a lump by the voice coil motor, each head needs to be independently positioned to the center of a target track by using a piezoelectric actuator for each head. In such a case, the gain characteristics of piezoelectric element of each head vary and it becomes difficult to position the head at a high speed and with a high precision. It is also necessary to simultaneously estimate the gain characteristics of the piezoelectric element of each head.

SUMMARY OF THE INVENTION

In consideration of the above problems, it is an object of the invention to provide a disk apparatus in which values of models of control targets from control signals to detection position signals between two or more different tracks and heads to perform the positioning in the disk apparatus are accurately obtained and variations of those values are set to be apparently constant.

Another object of the invention is to provide a disk apparatus in which variations of models of control targets from control signals to a detection position signal between two or more different tracks and heads to perform the positioning in the disk apparatus are estimated at a high speed and with a high precision and control means or various state estimating means are compensated on the basis of the estimation values to provide a control method of such an apparatus.

To accomplish the above objects, according to the invention, there is provided a disk apparatus comprising: a plurality of disks on which information is recorded; a plurality of heads to read out or write the information from/to the disks; head position detecting means for detecting a position of each head and generating a detection position signal; target position generating means for generating a target position signal to position each head to a target position; control means for generating a control signal of each head on the basis of a difference between the target position signal and the detection position signal and controlling each head; gain identifying means for identifying a gain from the control signal to the detection position signal; and memory means for storing the gain identified by the gain identifying means; and correcting means for correcting the control signal of the control means on the basis of the gain stored in the memory means, wherein the apparatus further comprises a respective head for each recording surface of the disks. The memory means stores the gain identified by the gain identifying means at a time point when each head is located at each of a plurality of track positions.

There is also provided a disk apparatus comprising: a plurality of disks on which information is recorded; a plurality of heads to read out or write the information from/to the disks; head position detecting means for detecting a position of each head and generating a detection position signal; target position generating means for generating a target position signal to position each head to a target position; control means for generating a control signal for each head on the basis of a difference between the target position signal and the detection position signal and for controlling each head; gain identifying means for identifying a gain from the control signal to the detection position signal; and memory means for storing the gain identified by the gain identifying means, wherein a respective head is provided for each recording surface of the disks and gain identifying means is provided for each head.

There is also provided a control method of a disk apparatus comprising the steps of: generating a target position signal for each head to read out or write information from/to disks on which information is recorded to a track; detecting a position of each head and generating a detection position signal; generating a control signal of each head on the basis of a difference between the target position signal and the detection position signal; identifying a gain from the target position signal to the detection position signal; and storing the gain into memory means, wherein the gain identifying step is a step of identifying a gain of each head at the plurality of track positions of every one of the plurality of heads.

Further, there is provided a control method of a disk apparatus having a plurality of heads for positioning each head to read out or write information from/to disks on which information is recorded to tracks to a target position, wherein after a disk surface is formatted, a target position signal of each head is generated, a position of each head is detected, a detection position signal is generated, a control signal of each head is generated on the basis of a difference between the target position signal and the detection position signal, a gain of each head from the target position signal to the detection position signal is identified for every head at a plurality of track positions, and the gain is stored on a memory surface formed on the disk, the gain stored on the memory surface on the disk is stored into memory means after a power source of the apparatus is turned on, the control signal of each head is corrected on the basis of the gain stored in the memory means, and the gain of each head from the control signal to the detection position signal is set to be made constant at a plurality of track positions.

Position information of the disk is recorded onto the disk by a servo track writer at the time of the first actuation of a magnetic disk apparatus after completion of the assembling or at a proper timing. Subsequently, a loop gain of the mechanism system of the disk apparatus is estimated some times at a plurality of positions in the radial direction of the disk and at the tracks at such positions or tracks near them. It is, consequently, possible to prevent a deterioration of an estimation precision which occurs due to a variation in gain estimation value at the representative position in the radial direction. Further, the gain estimation value at the representative position in the radial direction is interpolated by a method of least-squares or the like at each of the track positions, so that the gain at each track position can be estimated at a high precision.

The estimation of the loop gain of the mechanism system is executed by comparing the head positioning control signal from a computer or the like with the detection position signal of the head instructed and by controlling an output of the control means so that the loop gain of the mechanism system becomes apparently constant. Due to this, the gain of the position detection signal can be equally made to correspond to an input signal at any position in the radial direction of the disk and the reading precision of the signal can be improved. Further, by executing the above operations with respect to each head by using the same control means, the reading precision of the signal can be equally improved with respect to any head.

After the estimation of the loop gain of the mechanism system is finished with respect to a plurality of tracks of the disk for every head, the estimation value of the loop gain is recorded into the memory or on the disk. Therefore, even if the power source is shut off, the head thereafter can be promptly positioned by accessing the recorded estimation value, and the reading precision of the signal is not deteriorated.

The above and other objects, features, and advantages of the invention will be clearly understood from the following detailed description of the embodiments with reference to the accompanying drawings.

BRIEF DESCRIPTION OF THE DRAWINGS

FIG. 8 is a block diagram of a disk apparatus showing another embodiment of the invention.

DESCRIPTION OF THE PREFERRED EMBODIMENTS

Figure 1:
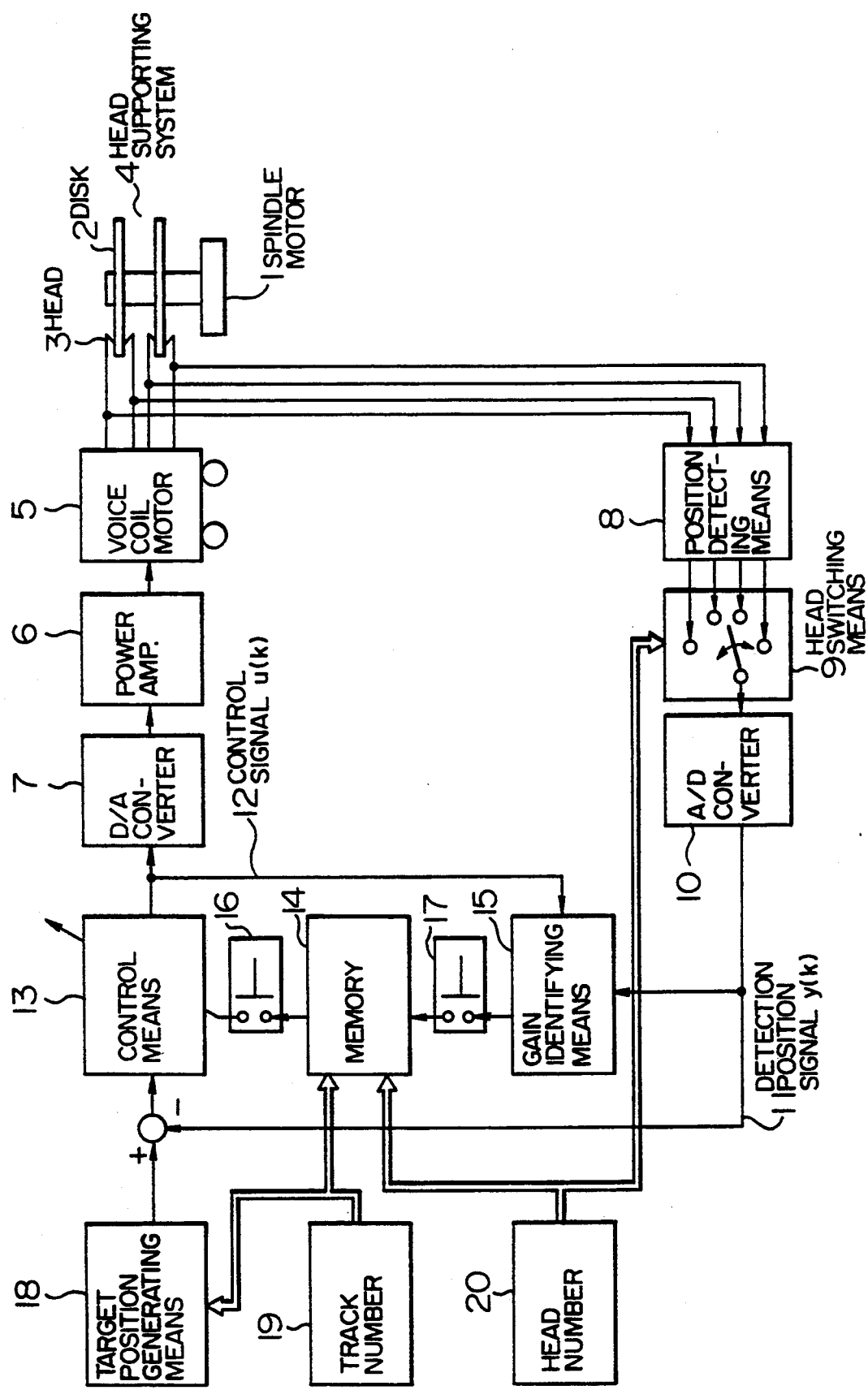
FIG. 1 is a block diagram of an embodiment of a disk apparatus of the invention.

FIG. 1 is a block diagram of a head positioning control apparatus of a magnetic disk showing an embodiment of the invention. Prior to practically explaining the embodiment, a fundamental construction of the invention will be first explained with reference to FIG. 1. An executing procedure of the embodiment is divided into two procedures represented by a positioning control mode and a gain estimation mode and both of them are distinguished by generation of a command.

In FIG. 1, a plurality of disks 2 are attached to a shaft which is rotated by a spindle motor 1. A head 3 is floating over the disk surface with a slight gap. The head 3 is supported by a head supporting system 4. The head supporting system 4 is fixed to a voice coil motor 5. In association with the movement of the voice coil motor 5, the head 3 is moved in the direction from the outer periphery to the inner periphery of the disk 2 or in the opposite direction and reads out information recorded on the track of the disk 2 or writes information onto the track of the disk 2.

The magnetic disk apparatus uses a sector servo system in which position reference signals recorded in the heads of the sectors of the tracks of all of the disks are read by the heads 3 and the positioning is executed in order to accomplish a high density recording. Therefore, all of the heads 3 are used as data heads.

The position reference signal obtained from each head is converted into the position signal by position detecting means 8 which has an arithmetic operating section to process the signal from the head. Head switching means 9 selects a target head number 20 to which a command has been ordered. The position signal generated from the position detecting means 8 of the target head is converted into the digital signal by an A/D (analog to digital) converter 10, so that a detection position signal 11 is derived. Target position generating means 18 selects a target track number 19 to which command has been ordered and generates a target position signal.

When the gain estimation mode is selected by the command, a switch 16 is opened and a switch 17 is closed. In this instance, gain identifying means 15 estimates a loop gain of a control target corresponding to the track number by using a control signal 12 and the detection position signal 11 at a time point when a target head is positioned to a target track. The loop gain of the control target is a function of a D/A converter 7, a power amplifier 6, the voice coil motor 5, the head supporting system 4, the heads 3, the position detecting means 8, and the A/D converter 10 and a sampling time. Further, gain identifying means 15 determines a gain of control means 13 by using the estimated loop gain. A memory 14 stores the track number 19, head number 20, and a gain of the control means 13 based on the gain estimation value in correspondence to the track number 19 and head number 20 to which commands have been ordered.

When the positioning control mode is selected by the command, the switch 16 is closed and the switch 17 is opened. In this instance, a gain of the control system corresponding to the target track number 19 and head number 20 designated by the commands is selected from the memory 14 and is set into the control means 13. The control means 13 generates the control signal 12 so that a difference between the detection position signal 11 and the target position signal is equal to 0. The control signal 12 is converted into an analog signal by the D/A (digital to analog) converter 7. The analog signal is amplified by the power amplifier 6. A current in accordance with the control signal is supplied to the voice coil motor 5, thereby moving the voice coil motor 5.

A hardware construction to realize the embodiment of FIG. 1 and its executing procedure will now be described hereinbelow.

Figure 2:
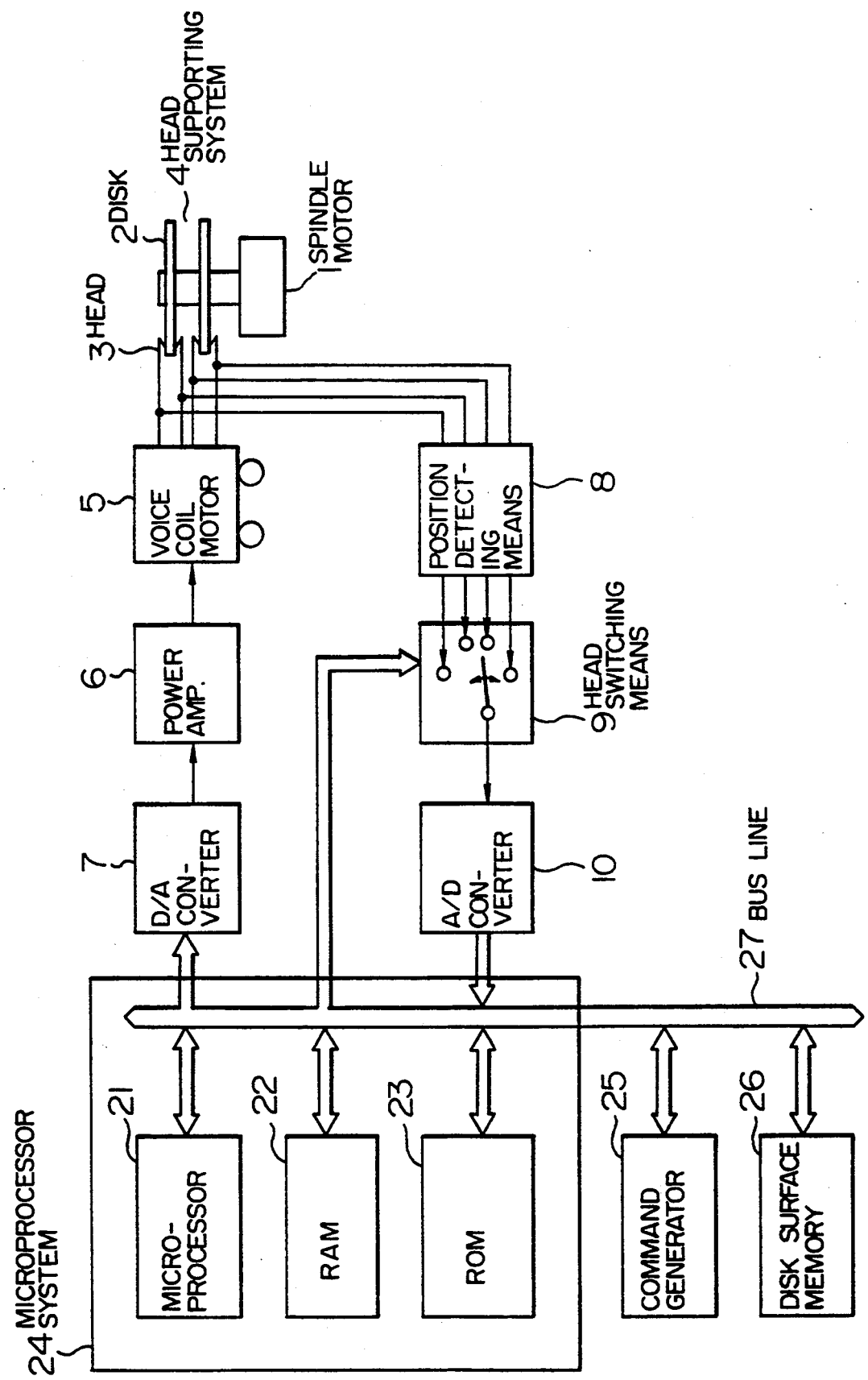
FIG. 2 is a block diagram of a hardware of an embodiment of the disk apparatus according to the invention.

FIG. 2 is a constructional diagram of a hardware to realize the disk control apparatus of the invention.

In a microprocessor system 24, a microprocessor 21 is connected to an RAM (random access memory) 22 and an ROM (read only memory) 23 through a bus line 27. Programs for the control means 13, target position generating means 18, and gain identifying means 15 are stored into the ROM 23. The gain of the control system based on the gain estimation value and the track number 19 and head number 20 selected in this instance are temporarily stored in the RAM 22.

A command generator 25 generates a command to designate either one of the positioning control mode and the gain estimation mode and determines the head number 20 and track number 19.

A disk surface memory 26 records the gain of the control means based on the gain estimation value and the track number and head number which are selected in this instance in a memory area on the disk surface which is not used by the user. The recorded information is preserved until new information is overwritten and the recorded information is stored in the RAM 22 after the turn-on of the power source. As to recording onto the disk surface, it is desirable to record the same information to all of the disk surfaces. By performing such a recording, in the case where the recorded information of a certain disk surface is lost for some reason, the information of the other disk surface still can be read out.

Figure 3:
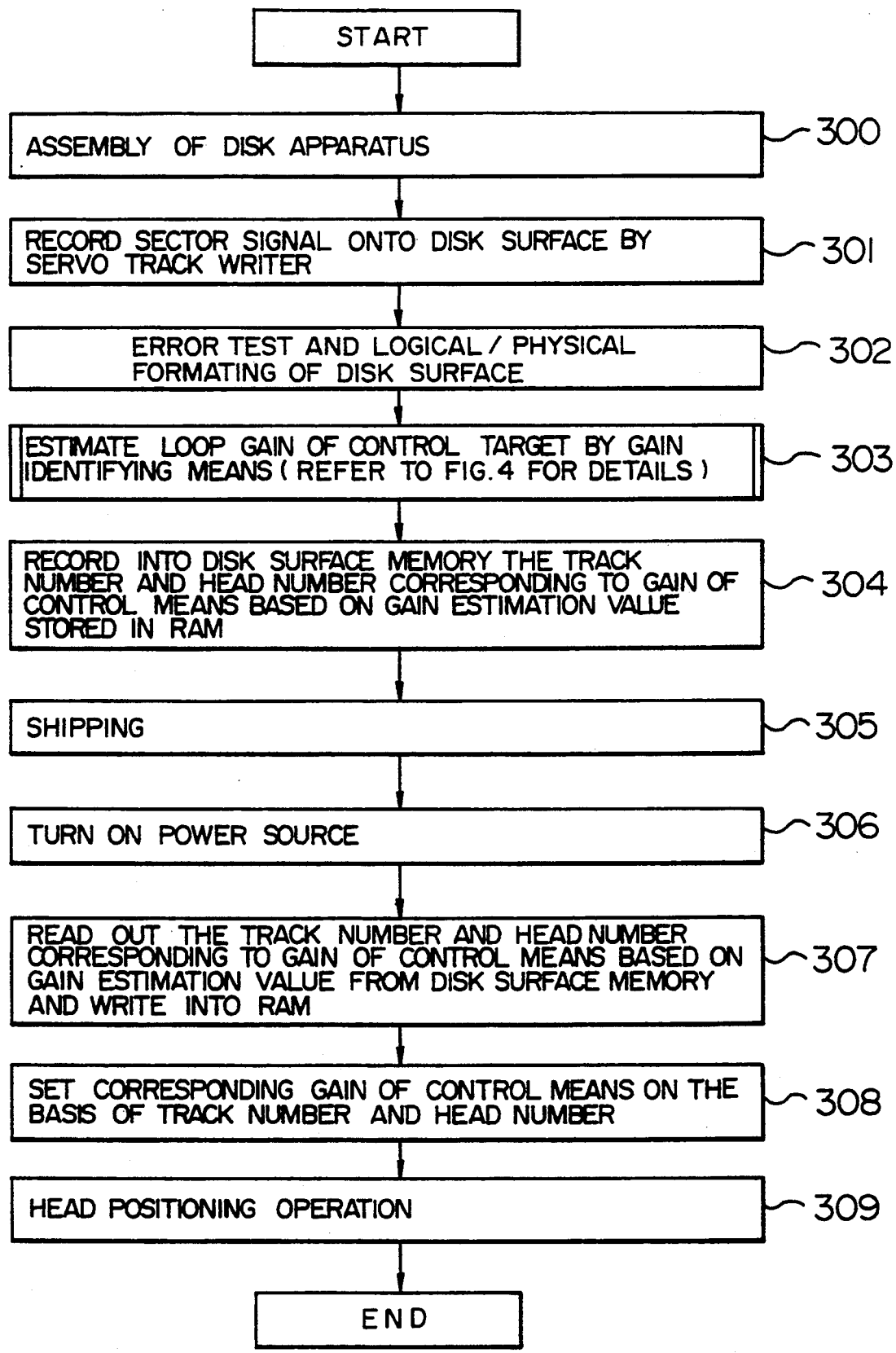
FIG. 3 is a flowchart for explaining an executing procedure of the embodiment of the invention.

FIG. 3 is a flowchart for explaining an executing procedure of the embodiment of the invention. After the disk apparatus is assembled (step 300), sector signals are recorded onto all of the disk surfaces by the servo track writer (step 301). Error tests of the disk surfaces and logic/physical formats are executed by a procedure similar to the conventional procedure (step 302). After completion of the formatting, the command generator generates a command to designate the gain estimation mode and the loop gain of the control target is estimated (step 303). A gain estimating procedure will be described in detail hereinlater with reference to FIG. 4. By executing the gain estimation after completion of the formatting, the loop gain at a time point when the disk apparatus becomes a stationary state, namely, when the control target reaches stable can be estimated. The gain estimation value is converted into the gain of the control means and stored into the disk surface memory together with the corresponding track number and head number (step 304). After completion of the above operations, the disk apparatus is shipped (step 305).

When the user turns on the power source of the disk apparatus (step 306), the gain of the control means obtained by the gain estimation value and the corresponding track number and head number are first read out from the disk surface memory and written into the RAM (step 307). When the command to designate the positioning control mode is generated, the track number and head number are selected and the gain of the control means corresponding thereto is set into the control means (step 308). The head positioning operation is executed (step 309).

In the above embodiment, the processes in steps 307 to 309 are executed at the initial turn-on of the power source by the user. However, they can be also executed in the factory before the apparatus is shipped. Or, they can be also executed each time the user turns on the power source. Further, while the user is executing the turn-on of the power source, the loop gain estimation of the control target is individually sequentially executed with respect to the heads or tracks and the information recorded on the disk surface can be also newly updated.

Figure 4:
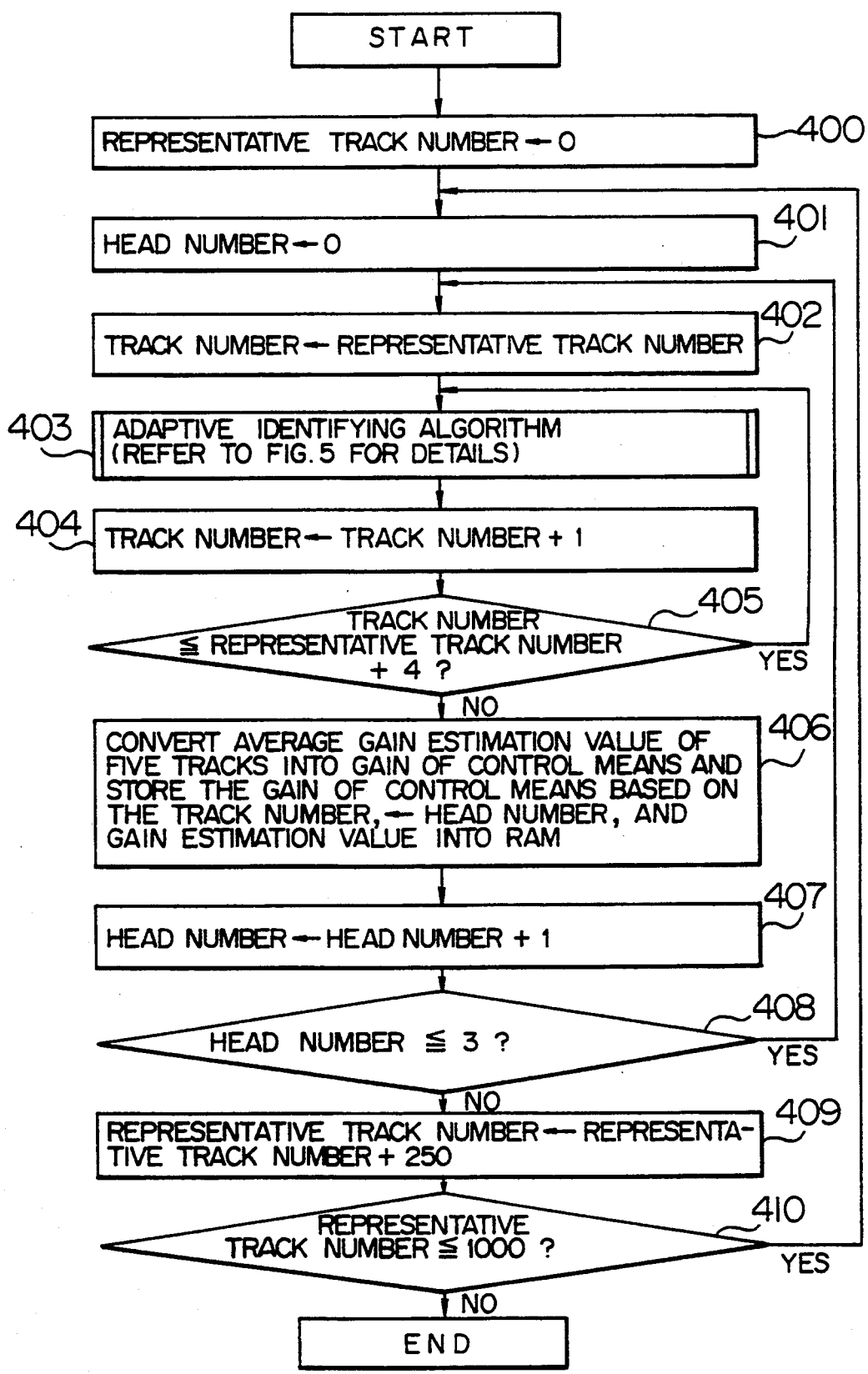
FIG. 4 is a flowchart for explaining an estimating procedure in a gain identifying means shown in FIG. 3.

FIG. 4 is a flowchart for explaining a procedure to estimate the loop gain of the control target by using the gain identifying means described in FIG. 3. For simplicity of explanation, the number of tracks of the disk apparatus is assumed to be 1005 and the number of heads is assumed to be four. The loop gain estimation is not executed for all of the tracks, but is executed with respect to representative tracks, such as the 0th track (outermost rim), 250th track, 500th track (center track), 750th track, and 1000th track (innermost rim). A portion between the tracks is interpolated by a curve or a straight line using the change curve for the track position of the voice coil motor which has previously been measured. The above loop gain estimation is executed for all of the heads. The estimation of the loop gain will now be described in detail hereinbelow.

First, the representative track number is set to the 0th track (step 400). The command generator generates a command to designate the 0th head as a head number (step 401) and a command to designate the representative track number as a track number (step 402). At this time point, the 0th head is positioned to the 0th track. A gain identifying algorithm is executed and the loop gain of the control target in the 0th head and the 0th track is estimated from the control signal and the detection position signal (step 403). The gain identifying algorithm is shown in detail in FIG. 5. Although the estimated value can be also set to a gain estimation value of the control target in the 0th track (outermost rim), average value of the several gain estimation values is used as an estimation value here.

The track number is increased by 1 and the 0th head is positioned to the first track (step 404). Processes in steps 403 and 404 are repeated until the track number is equal to 4 (step 405). The maximum and minimum values among the five gain estimation values obtained are eliminated and the average value is calculated from the three remaining estimation values and set to a loop gain of the control target of the 0th track and the 0th head. By executing the operations as mentioned above, although a long estimation time is required, the reliability of the estimation value is improved. Particularly, in the case where the loop gain of the control target of only a special track is lower or higher than those of the neighbor tracks for some reason, the estimating precision can be improved by eliminating the maximum and minimum values among the estimation values. Subsequently, the gain estimation value is converted into the gain of the control means. The gain of the control means based on the 0th track, 0th head, and gain estimation value is stored into the RAM (step 406). By storing the gain of the control means, when the positioning control mode is selected by the command, the positioning control can be performed without converting the gain estimation value of the control target.

Subsequently, the head number is increased by 1 and the second head is positioned to the 0th track (step 407). The above processes in steps 401 to 406 are executed. After that, the processes in steps 401 to 406 are similarly executed for all of the heads (step 408).

Further, the representative track number is set to 250 after adding 250 tracks and the procedure in steps 401 to 408 is executed (step 409). After completion of the estimation when the representative track number is equal to 1000, the gain estimation is finished (step 410).

A two-dimensional table of the set gain of the control means in which the axis of ordinate indicates the head number and the axis of abscissa shows the track number is formed in the RAM due to the above operations. In the above description, the set gain of the control means calculated by the estimation gain of the control target has been stored in the RAM. However, the estimation gain of the control target may be also directly stored and converted into the gain of the control means in the positioning control mode.

Figure 5:
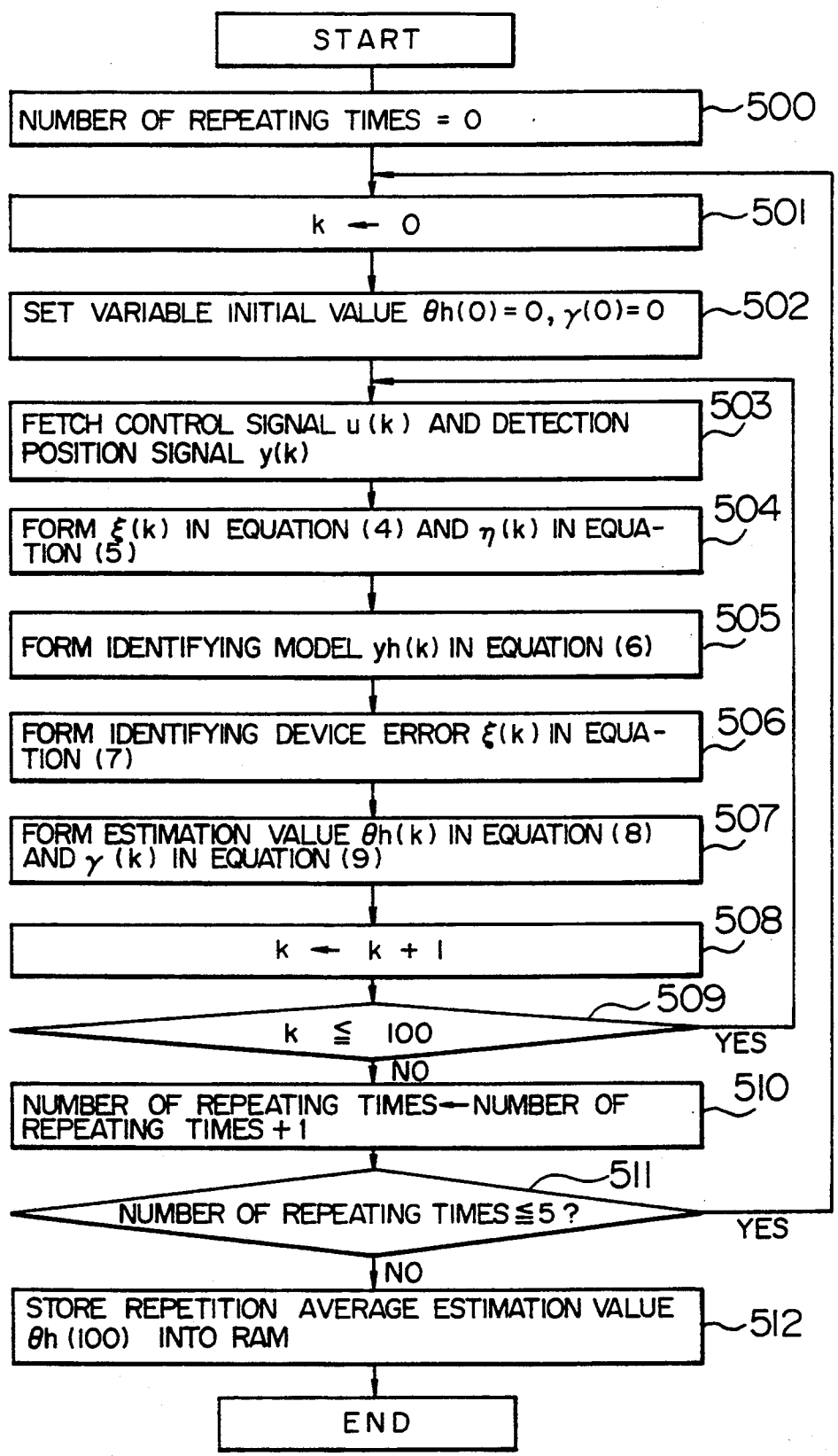
FIG. 5 is a flowchart for explaining a calculating procedure of a gain identifying algorithm shown in FIG. 4.

FIG. 5 is a flowchart for explaining a calculating procedure of the gain identifying algorithm shown in FIG. 4.

First, a procedure to model the control target will now be explained with reference to FIG. 1. In FIG. 1, an external force which acts on the head supporting system and works, for example, as the rigidity of a lead wire (flexible printed circuit) FPC is not shown. The external force will be explained on the assumption that the estimation had previously been completed by an external force estimating device or the like and an input to cancel the external force has been generated. Upon modeling, the control target is assumed as a linear secondary system. Such an assumption is accepted for many disk apparatuses by setting a frequency of a target position signal which is generated at the time of estimation of the gain to a value near the zero-cross frequency or lower.

In case of FIG. 1, a modeled discrete time transfer function in a range from a control signal u(k) to a detection position signal y(k) is expressed by the following equation (1) in which a sampling time is assumed to be T. It is now assumed that $z^{-1}$ denotes a delay operator and k indicates the number of steps.

$$y(k) = \frac{\theta(z^{-1} + z^{-2})}{1 - 2z^{-1} + z^{-2}} u(k) \quad (1)$$

A loop gain $\Theta$ of the control target is given by the following equation (2).

$$\theta = \frac{kDA \cdot kA \cdot kF \cdot kp \cdot kAD \cdot T^2}{2M} \quad (2)$$

Physical meanings of the symbols which are used in the above equations and units are as follows.
y(k): sample position signal (V)
u(k): sample control signal (v)
m: equivalent mass of the head and head supporting system (kg)
kDA: gain of the D/A converter (—)
kA: gain of the power amplifier (A/V)
kF: force constant of the voice coil motor (N/A)
kP: gain of the position detecting means (V/m)
kAD: gain of the A/D converter (—)

The equation (1) can be rewritten to an identifying expression of the following equation (3)

$$\begin{aligned} y(k) &= \theta \cdot (u(k-1) + u(k-2)) + (2y(k-1) - y(k-2)) \\ &= \theta\zeta(k) + \eta(k) \end{aligned} \quad (3)$$

where, $$\zeta(k) = u(k-1) + u(k-2) \quad (4)$$

$$\eta(k) = 2y(k-1) - y(k-2) \quad (5)$$

An estimating method of the loop gain $\Theta$ of the control target will now be explained. It is an object of this method to estimate $\Theta h(k)$ as a good approximation value (estimation value) of $\Theta$ from y(k), $\zeta$(k), and $\eta$(k). In this example, $\Theta$ is estimated by a method of least squares. The method of least squares is effective to estimate $\Theta$ at a high precision because the control signal u(k) and the detection position signal y(k) include noise components. Therefore, an identifying model of the following equation (6) is constructed for the equation (3).

$$yh(k) = \Theta h(k-1)\zeta(k) + \eta(k) \quad (6)$$

An identifying device error $\epsilon(k)$ is determined by the following equation (7).

$$\begin{aligned} \epsilon(k) &= y(k) - yh(k) \\ &= [\theta - \theta h(k-1)]\zeta(k) \end{aligned} \quad (7)$$

In this instance, an adaptive adjustment rule updates the parameter estimation value $\Theta h(k)$ by using the following algorithm specified by the following equations (8) to (9) and inequality (10).

$$\theta h(k) = \theta h(k-1) + \frac{\gamma(k-1)\zeta(k)}{1 + \gamma(k-1)\zeta^2(k)} \epsilon(k) \quad (8)$$

$$\gamma(k) = \frac{\gamma(k-1)}{1 + \gamma(k-1)\zeta^2(k)} \quad (9)$$

$$\gamma(0) > 0 \quad (10)$$

A calculating routine of the gain identifying means will now be explained hereinbelow with reference to FIG. 5.

First, the number of repeating times is set to 0 (step 500). The number k of steps is set to 0 (step 501). An initial value $\Theta h(0)$ of the estimation parameter of the loop gain of the control target and an initial value $\gamma(0)$ of the updating value of the adjustment rule are determined (step 502). Although $\Theta h(0)$ can be set to an arbitrary value, $\gamma(0)$ is a parameter to determine the converging speed of the estimation value and the converging speed increases as $\gamma(0)$ is set to a larger value. In this example, $\Theta h(0)=0$ and $\gamma(0)=100$ and the converging speed becomes high.

Subsequently, the detection position signal y(k) is fetched from the A/D converter and the control signal u(k) is formed by the control means (step 503). The target position signal generator generates a sine wave-like target position signal of a microamplitude in which the track designated by the command is set to a center. It is necessary to set the frequency of the target position signal in a manner such that the control target lies within a linear frequency band. Generally, the frequency of the target position signal is set to a value near the zero-cross frequency or lower. In this example, it is set to 400 Hz. It is desirable to set an amplitude of the target position signal to a larger value in a linear range of the position signal. In this example, it is set to a value of ±(track interval/4) μm. On the basis of the value, $\zeta(k)$ in the equation (4) and $\eta(k)$ in the equation (5) are calculated (step 504). yh(k) in the equation (6) is calculated (step 505). $\epsilon(k)$ in the equation (7) is calculated (step 506). $\Theta h(k)$ in the equation (8) is calculated, the estimation value of the loop gain of the control target is obtained, and $\gamma(k)$ in the equation (9) is updated (step 507). The number of steps is increased by 1 (step 508) after that. The processes in steps 503 to 508 are repetitively executed.

When the number k of steps is equal to 100 (the disk rotates about ⅔ time) or more, the number of repeating times is increased by 1 (step 510). The processes in steps 501 to 510 are repetitively executed. The maximum and minimum values among the five gain estimation values obtained are eliminated and the average value is calculated from the three remaining estimation values and stored as a gain estimation value $\Theta h(100)$ into the RAM (step 512). Although the setting of the number of repeating times is directly concerned with the time for gain estimation, in case of reducing the estimating time, those processes are not repeated. In case of the embodiment, the estimation value $\Theta h(k)$ is almost converged at a time point when the number k of steps is equal to 50. According to the experiments by the inventors of the present invention, it has been confirmed that the estimation is completed at an accuracy of ±2% in 100 steps. It has been also confirmed that by interpolating the portion between the tracks on the basis of such an estimation value, a variation of the loop gains from the control signals to the detection position signals of two or more different heads and tracks can be maintained to a range of ±4%.

Figure 6:
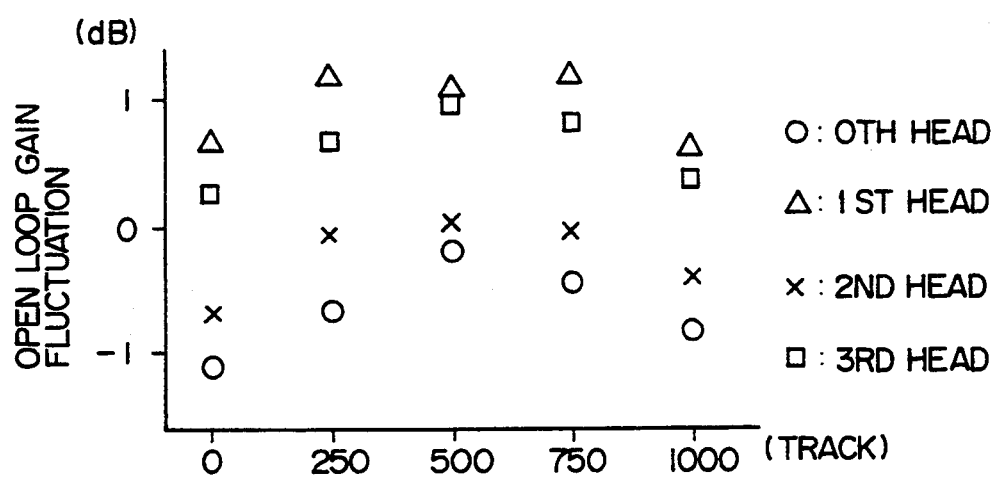
FIG. 6 is a diagram of an open loop gain at zero-cross frequencies between tracks and at every head before a method of the invention is embodied.
Figure 7:
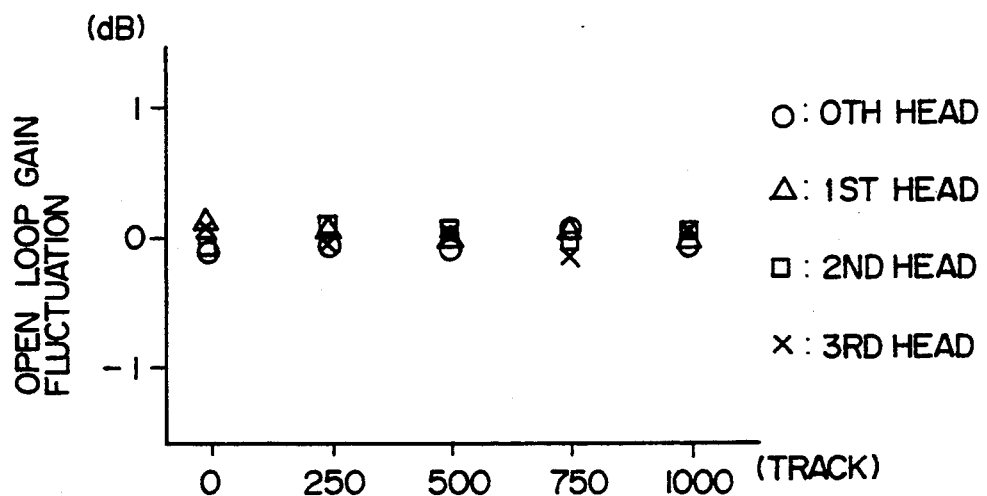
FIG. 7 is a diagram of an open loop gain at zero-cross frequencies between tracks and at every head after the method of the invention was embodied.

FIG. 6 shows open loop gains at the zero-cross frequency between the tracks and between the heads before the method of the invention is embodied. It will be understood that the open loop gains for a special track in four heads values about up to 2 dB. This is because a work tolerance of the core width of the head varies. It will be also understood that the gains at the outer periphery (0th track) and inner periphery (1000th track) are low and the gain at the intermediate position (500th track) is about 1 dB higher. This is because of a fluctuation of the force constant of the voice coil motor depending on the track position. On the other hand, FIG. 7 shows open loop gains at the zero-cross frequency between the tracks and between the heads after the method of the invention was embodied. The loop gain of the control target of every head and every representative track is estimated at a high speed and a high precision by using the gain identifying means. The gain of the control means is set so that the open loop gain of every head and every representative track is equal to 0 dB at the zero-cross frequency. With respect to the tracks between the representative tracks, the force constant of the voice coil motor which has previously been known is set to a function having the track number as a variable. The portion between the tracks is interpolated by a curve or a straight line on the basis of such a function. Thus, the open loop gains of a plurality of heads which are positioned in the disk apparatus for all of the tracks can be made constant at the zero-cross frequency.

FIG. 8 is a block diagram of a head positioning control apparatus of a magnetic disk showing another embodiment of the invention. In FIG. 8, to position each head 3 to the center of the target track, the same number of piezoelectric actuators 28 as the number of heads are attached to the voice coil motor 5. The piezoelectric actuators 28 can be attached to any position so long as each actuator is located between the voice coil motor 5 and each head 3. Due to this, the data recorded on a plurality of disk surfaces can be simultaneously read out or written by all of the heads. According to the procedure, after all of the heads 3 are moved as a group by the voice coil motor 5, in order to position each head 3 to the center of the target track, the positioning of each head is performed independently by using the respective piezoelectric actuator 28.

The estimation of the control target including the characteristics of the piezoelectric element is simultaneously independently performed for each head by using the control signal 12 and the detection position signal 11 of each head.

When the gain estimating mode is selected by the command, the switch 16 is opened and the switch 17 is closed. In this instance, the gain identifying means 15 estimates the loop gain of the control target corresponding to the target track number 19 by using the control signal 12 and the detection position signal 11. The loop gain of the control target here comprises the gain from the D/A converter 7 to the power amplifier 6, voice coil motor 5, piezoelectric actuator 28, head supporting system 4, head 3, position detecting means 8, and A/D converter 10 and a function of the sampling time. Further, the gain identifying means 15 determines the gain of the control means 13 on the basis of the estimated loop gain. The memory 14 stores the track number 19 and the gain of the control means 13 based on the gain estimation value in correspondence to the track number 19 designated by the command.

A practical procedure of the estimation is executed in a manner similar to the first embodiment. However, in case of estimating the gain of the control target including the characteristics of the piezoelectric element, it is necessary to set a frequency of the sine wave-like target position signal to a high frequency, for example, 1 kHz at which the piezoelectric element effectively functions.

On the other hand, in case of estimating the gain of the control target which doesn't include the characteristics of the piezoelectric element, it is necessary to set the frequency of the sine wave-like target position signal to a frequency in a middle band, for example, 400 Hz in a manner similar to the first embodiment.

Although the magnetic disk apparatus has been mentioned in the above embodiment, the invention can be also similarly realized in case of using another recording medium, such as an optical disk.

In the above embodiment, one control means has been used and corrected on the basis of the estimation value. However, the invention doesn't limit the number of control means.

Further, internal models of various kinds of estimating devices based on the control target, such as the internal model of a state estimating device to estimate a state amount, the internal model of an external force estimating device to estimate an external force amount, the internal model of an eccentricity estimating device to estimate a disk eccentricity amount, and the like, can be also estimated by using the method of the invention. On the other hand, it has been confirmed that the estimating precision is improved by using the method of the invention.

According to the invention, when the head in the disk apparatus is positioned to the track, the loop gain of the control target is estimated. Such an estimation is performed for every head at a plurality of track positions and its estimation value is interpolated, thereby obtaining the loop gains of all of the tracks. Thus, it is possible to provide a disk apparatus in which the gains from the control signals of the heads to be positioned to the detection position signals are set to be almost constant with respect to all of the heads and all of the tracks. The movement of the high speed head can be realized and the variation of the positioning operation of the head can be also reduced.

What is claimed is:

1. A disk apparatus comprising:
    a disk on which positional information prescribing a central line of a track is previously recorded;
    a head for reading out information, including said positional information, from said disk during rotation thereof;
    an actuator for moving said head and a member supporting said head;
    an amplifier for driving said actuator;
    position detecting means for detecting positional information read out by said head at intervals of a predetermined sampling time;
    an analog/digital converter for converting an output signal of said position detecting means into a digital signal to generate a detection position signal;
    target position generating means for generating a target position signal in the form of a sinusoidally varying signal to position said head at a target position;
    control means for generating a control signal to control movement of said head on the basis of a difference between the target position signal and said detection position signal, said control means having an adjustable gain;
    a digital/analog converter for converting the control signal into an analog control signal and for supplying said analog control signal to said amplifier;
    gain identifying means for generating an identifying model, on the basis of said detection position signal, said control signal and an adjustable gain of said identifying model, and representing physical models of elements to be controlled, including said digital/analog converter, said amplifier, said actuator, said head, said position detecting means and said analog/digital converter, including adaptive adjusting means for setting a difference between said detection position signal and an output signal of said identifying model to be an identifying error signal and for repetitively adjusting the adjustable gain of said identifying model to cause said identifying error signal to decrease;
    memory means for storing therein the gain of said identifying model; and
    correcting means for correcting the adjustable gain of said control means during subsequent positioning operations of said head on the basis of the gain of said identifying model stored in said memory means.

2. A disk apparatus according to claim 1, wherein a frequency of said target position sinusoidal signal generated by said target position generating means is substantially similar to or less than a servo band frequency of said control means.

3. A disk apparatus according to claim 1, wherein said identifying model is determined on the basis of a one-sample and two-sample of past values of said detection position signal, a one-sample and two-sample of past values of said control signal, and said adjustable gain.

4. A disk apparatus according to claim 1, wherein the adjustable gain of said identifying model adjusted by said adaptive adjusting means is obtained by adding a signal obtained through calculation based on said identifying error signal to a one-sample past value of said adjustable gain.

5. A disk apparatus according to claim 1, wherein the gain of said identifying model stored in said memory means is recorded in a region on the disk which a user of said disk cannot use.

6. A disk apparatus comprising:
    a plurality of disks on which positional information prescribing a central line of a track is previously recorded;
    a plurality of heads associated with said plurality of disks for reading out information, including said positional information, from said disks during rotation thereof;
    an actuator for moving the heads and members supporting the heads;
    an amplifier for driving said actuator;
    position detecting means for detecting positional information read out by each of said heads at intervals of a predetermined sampling time;
    head switching means for performing a switching operation in response to a signal obtained from said position detecting means;
    head number generating means for issuing a command, indicative of a head number to be selected, to said head switching means;
    an analog/digital converter for converting an output signal of said head switching means into a digital signal to generate a detection position signal;
    target position generating means for generating a target position signal to position each head at a target position;
    track number generating means for issuing to said target position generating means a command indicative of a track number to which the head selected by said head number generating means is to be moved;

control means for generating a control signal to control movement of the head selected by said head number generating means on the basis of a difference between said target position signal and said detection position signal, said control means having an adjustable gain;

a digital/analog converter for converting said control signal into an analog control signal and for supplying said analog control signal to said amplifier;

said target position generating means generating said target position signal as a sinusoidally varying signal for said track selected by said track number generating means;

gain identifying means for generating an identifying model, on the basis of said detection position signal, said control signal and an adjustable gain of said identifying model, and representing physical models of elements to be controlled, including said digital/analog converter, said amplifier, said actuator, said head selected by said head number generating means, said position detecting means and said analog/digital converter, including adaptive adjusting means for setting a difference between said detection position signal and an output signal of said identifying model to be an identifying error signal and for repetitively adjusting the adjustable gain of said identifying model to cause said identifying error signal to be small;

memory means for storing therein as a set of information said head number of the head selected by said head number generating means, said track number of the track selected by said track number generating means and the gain of said identifying model, which has been subjected to adjustment by said adaptive adjusting means, for the track with use of the associated head; and correcting means for correcting the adjustable gain of said control means during subsequent positioning operations of said head when said head is positioned at said track on the basis of the head number of the head selected by said head number generating means and the gain of said identifying model stored in said memory means associated with the track number of the track selected by said track number generating means.

7. A disk apparatus according to claim 6, wherein a frequency of said target position sinusoidal signal generated by said target position generating means is substantially similar to or less than a servo band frequency of said control means.

8. A disk apparatus according to claim 6, wherein said identifying model is determined on the basis of a one-sample and two-sample of past values of said detection position signal, a one-sample and two-sample of past values of said control signal, and said adjustable gain.

9. A disk apparatus according to claim 6, wherein the adjustable gain of said identifying model adjusted by said adaptive adjusting means is obtained by adding a signal obtained through calculation based on said identifying error signal to a one-sample past value of said adjustable gain.

10. A disk apparatus according to claim 6, wherein plural sets of information of said head number, said track number and the gain of said identifying model are provided with respect to all heads and said plurality of tracks, and said plurality of sets of information are recorded in regions on surfaces of said plurality of disks which a user of said disks cannot use.

11. A disk apparatus according to claim 6, wherein plural sets of information of said head number, said track number and the gain of said identifying model are provided with respect to all heads and said plurality of tracks, and further comprising interpolating means for interpolating the gains of said identifying model obtained for all heads with respect to all tracks.

12. A disk apparatus according to claim 6, wherein plural sets of information of said head number, said track number and the gain of said identifying model are provided with respect to all heads and said plurality of tracks, and further comprising interpolating means, responsive to a previously determined force gain corresponding to the track position of an actuator, for interpolating the gains of said identifying model obtained for all heads with respect to all tracks.

13. A disk apparatus according to claim 6, wherein fluctuation in a gain of a loop including said digital/analog converter, said amplifier, said actuator, said head, said position detecting means, said analog/digital converter and said control means with respect to said plurality of heads and said plurality of tracks is controlled to within $\pm 4\%$.

14. A disk apparatus comprising:
a plurality of disks on which information is recorded;
a plurality of heads for reading out or writing said information from or to said disks;
head position detecting means for detecting a position of a head with respect to a disk and for outputting a detection position signal;
a first actuator for independently positioning each head in a fine positional range;
a second actuator for moving said plurality of heads, said first actuator for independently driving said heads and a member integrally supporting the heads and said first actuator;
target position generating means for generating a target position signal to position each head at a target position;
control means for controlling first actuator for independent drive of the heads on the basis of a difference between said target position signal and said detection position signal, said control means having an adjustable gain;
said target position generating means generating said target position signal as a sinusoidal signal having a frequency substantially similar to or less than a servo band frequency of said first actuator; and
gain identifying means for identifying gain, from said control signal and said detection position signal, of each circuit including a head and said first actuator.

15. A method of controlling a disk apparatus comprising the steps of:
reading out positional information prescribing a central line of a track of a disk on which said positional information is previously recorded by a head;
moving said head and a member supporting the head by means of an actuator;
driving said actuator by means of an amplifier;
detecting said positional information read out by said head at intervals of a predetermined sampling time by position detecting means;
converting an output signal of said position detecting means into a digital signal by said means of an analog/digital converter to generate a detection position signal;

generating a target position signal to position said head at a target position using target position generating means;

generating a control signal for the head on the basis of a difference between said target position signal and said detection position signal using control means having an adjustable gain; and converting said control signal into an analog control signal by means of a digital/analog converter to supply said analog control signal to an amplifier;

wherein when a command indicates a gain estimation mode of operation, the steps which follow are executed in a plurality of tracks:

(a) moving the head to the track selected by track number generating means;

(b) generating said target position signal in the form of a sinusoidal signal by target position generating means;

(c) on the basis of one-sample and two-sample past values of said detection position signal, one-sample and two-sample past values of said control signal and an adjustable gain of an identifying model, generating said identifying model representing physical models of elements to be controlled, including said digital/analog converter, said amplifier, said actuator, said head, said position detecting means and said analog/digital converter, and producing an output signal of said identifying model;

(d) calculating an identifying error signal on the basis of a difference between said detection position signal and an output signal of said identifying model;

(e) repetitively adjusting the adjustable gain of said identifying model to cause adaptive adjusting means to decrease said identifying error signal;

(f) calculating the adjustable gain of said control means on the basis of the gain of said identifying model which has been subjected to the adjustment by said adaptive adjusting means; and (g) storing in memory means the gain of said control means calculated by said adaptive adjusting means;

and wherein, when a command indicates a positioning control mode of operation, the steps which follow are executed:

(h) reading out the stored gain of the control means associated with a track number generated by track number generating means after the head is moved to the selected track; and (i) correcting the control means on the basis of the read-out gain of the control means.

16. A control method according to claim 15, wherein said step (f) includes adding a signal obtained through calculation based on said identifying error signal to a one-sample past value of said adjustable gain.

17. A method for controlling a disk apparatus comprising the steps of:

reading out positional information prescribing a central line of a track of a plurality of disks on which said positional information is previously recorded by a plurality of heads;

moving said plurality of heads and a member integrally supporting the heads by means of an actuator;

driving said actuator by means of an amplifier;

detecting said positional information read out by each head at intervals of a predetermined sampling time by means of position detecting means;

issuing a command indicative of a head number to be selected to head switching means by head number generating means;

switching a signal obtained from said position detecting means on the basis of said selected head number by said head switching means;

converting an output signal of said head switching means into a digital signal by said means of an analog/digital converter to generate a detection position signal;

issuing a command indicative of a track number selected by head number generating means for a head to be moved to a target position;

generating a target position signal to position each head at a target position by means target position generating means in response to an issued command;

generating a control signal for a head selected by said head number generating means on the basis of a difference between said target position signal and said detection position signal using control means having an adjustable gain; and converting said control signal into an analog control signal by means of a digital/analog converter to supply said analog control signal to an amplifier;

wherein, when a command indicates a gain estimation mode of operation, the steps which follow are executed with respect to the track selected by said head number generating means:

(a) selecting of said heads;

(b) generating by means of said target position generating means said target position signal as a sinusoidal at said track selected by said track number generating means;

(c) on the basis of one-sample and two-sample past signals of said detection position signal, one-sample and two-sample past signals of said control signal and an adjustable gain of an identifying model, calculating an output signal of an identifying model representing physical models to be controlled including said digital/analog converter, said amplifier, said actuator, said head selected by said head number generating means, said position detecting means and said analog/digital converter;

(d) calculating an identifying error signal on the basis of a difference between said detection position signal and an output signal of said identifying model;

(e) repetitively adjusting the adjustable gain of said identifying model to cause adaptive adjusting means to decrease said identifying error signal;

(f) calculating the adjustable gain of said control means on the basis of the gain of said identifying model after subjected to the adjustment by said adaptive adjusting means;

(g) storing a set of information of said head number of the head selected by said head number generating means, said track number of the track selected by said track number generating means, and the adjustable gain of said control means calculated in the track with use of the head; and (h) after execution of said steps (a) through (g), said steps (a) through (g) are sequentially executed with respect to each head, at the same track;

wherein, when a command indicates a positioning control mode of operation, the steps which follow are executed:

(i) after the head is selected by said head number generating means and the track is selected by said track number generating means, reading out the stored gain of the control means associated with said head number and said track number; and (j) correcting the control means on the basis of the read-out gain of the control means.

18. A control method according to claim 17, wherein said step (f) includes adding a signal obtained through calculation based on said identifying error signal to a one-sample past value of said adjustable gain.

19. A method for controlling a disk apparatus having a plurality of information reading/writing heads which are positioned at respective target positions to read out or write information from or to a plurality of disks with tracks having information recorded therein, said method comprising the steps of:

at the end of formatting a disk surface, generating a target position signal as a sinusoidal signal at said target position with respect to said head;

detecting a position of said head and outputting a detection position signal;

outputting a control signal to drive said head;

identifying a gain from said control signal and said detection position signal for a plurality of track positions with respect to each of said heads;

storing said gain on a storage surface of said disk;

after a power supply of said disk apparatus is turned on, storing said gain stored on the storage surface of said disk in memory means; and correcting the control signal for each of said heads on the basis of said gain stored in said memory means.

20. A disk apparatus, comprising:

a disk on which sector signals of positional information prescribing a central line of a track is recorded;

a head for reading out information, including the positional information, from said disk during rotation thereof;

an actuator for moving said head and a member supporting said head;

an amplifier for driving said actuator;

position detecting means for detecting positional information read out by said head at intervals of a predetermined sector cycle;

an analog/digital converter for converting an output signal of said position detecting means into a digital signal to generate a detection position signal;

target position generating means for generating a target position signal to position said head at a target position;

control means for generating a control signal to control movement of said head based on a difference between the target position signal and the detection position signal, said control means having an adjustable gain;

a digital/analog converter for converting the control signal into an analog control signal and for supplying the analog control signal to said amplifier;

wherein said target position generating means generates the target position signal as a sinusoidal signal having an amplitude smaller than a track width and a frequency of nearly a servo band frequency of said control means or less;

gain identifying means for generating an identifying model, based on a first signal obtained by subtracting the detection position signal from two times the detection position signal, 1 a second signal obtained by adding the control signal to the control signal, and the adjustable gain, and for representing physical models of elements to be controlled, including said digital/analog converter, said amplifier, said actuator, said head, said position detecting means and said analog/digital converter, said identifying model being calculated by adding the product of the adjustable gain and the second signal to the first signal, said gain identifying means includes adaptive adjusting means for calculating the adjustable gain of a current sector by adding the adjustable gain to an identifying error signal, obtained by subtracting an output signal of said identifying model from the detection position signal, and the second signal to cause the identifying error signal to decrease as time goes on;

memory means for storing the gain of said identifying model adjusted by said adaptive adjusting means in the position corresponding to said track position, after the identifying error signal decreases to zero; and correcting means for correcting the adjustable gain of said control means based on the gain stored in said memory means and correcting the gain of said control means with respect to the track position.

21. A disk apparatus according to claim 20, wherein the gain of said identifying model of a track is defined as an average of the gain of said identifying model calculated with respect to the track position and the plurality of gains calculated with respect to the periphery of the track position except a minimum value and a maximum value in the gains.

22. A method for controlling a disk apparatus having a plurality of information reading/writing heads which are positioned at respective target positions to read out or write information from or to, respectively, a plurality of disks with tracks having information recorded therein, said method comprising the steps of:

formatting a disk surface;

generating a target position signal as a sinusoidal signal at a target position with respect to said head, the sinusoidal signal having an amplitude less than a track width and a frequency of a servo band frequency for positioning or less;

detecting a position of said head and outputting a detection position signal;

outputting a control signal to drive said head so as to coincide with the detection position signal with the target position signal, said control signal being adjusted by an adjustable gain;

calculating a first signal by subtracting the detection position signal 2 sector before from the detection position signal 1 sector before, a second signal by adding the control signal 1 sector before to the control signal 2 sector before;

calculating output signal of identifying model obtained by adding the first signal to the product of the adjustable gain and the second signal;

calculating an identifying error signal indicating the difference between an output signal of said identifying model and the detecting position signal;

calculating the adjustable gain of current sector by adding the adjustable gain of 1 sector before to some times the product of the identifying error signal and the second signal to cause said identifying error signal to be small as time goes on;

storing the gain of the identifying model for a plurality of track positions with respect to each of said heads on memory means after the identifying error signal is almost converged to zero.

further storing said gain on a storage surface of said disk;

after a power supply of said disk apparatus is turned on, storing said gain stored on the storage surface of said disk in the memory means; and correcting the control signal for each of said heads on the basis of said gain stored in said memory means.

* * * * *

UNITED STATES PATENT AND TRADEMARK OFFICE
CERTIFICATE OF CORRECTION

PATENT NO. : 5,404,255
DATED      : April 4, 1995
INVENTOR(S): M. KOBAYASHI, et al.

It is certified that error appears in the above-identified patent and that said Letters Patent is hereby corrected as shown below:

In the drawings,

In Figure 1, delete "4 HEAD SUPPORTING SYSTEM" and insert --4 HEAD SUPPORTING SYSTEM-- before "3 HEAD".

In Figure 2, delete "4 HEAD SUPPORTING SYSTEM" and insert --4 HEAD SUPPORTING SYSTEM-- before "3 HEAD".

In Figure 8, delete "HEAD SUPPORTING SYSTEM" and insert --4 HEAD SUPPORTING SYSTEM-- before "3 HEAD".

Signed and Sealed this

Tenth Day of October, 1995

*Attest:*

BRUCE LEHMAN

*Attesting Officer*  Commissioner of Patents and Trademarks